(12) United States Patent
Beavers

(10) Patent No.: US 6,187,369 B1
(45) Date of Patent: Feb. 13, 2001

(54) HYDROPHILIC SUBSTRATES AND METHOD OF MAKING SAME

(75) Inventor: Ellington M. Beavers, Meadowbrook, PA (US)

(73) Assignee: Biocoat Incorporated, Fort Washington, PA (US)

( * ) Notice: Under 35 U.S.C. 154(b), the term of this patent shall be extended for 0 days.

(21) Appl. No.: 09/191,416

(22) Filed: Nov. 12, 1998

(51) Int. Cl.$^7$ ............................... B05D 3/10; B32B 17/00
(52) U.S. Cl. .................. 427/2.24; 427/2.3; 427/2.31; 427/333; 428/333; 428/426; 428/447; 428/457; 428/522; 606/76; 606/77; 623/1.46
(58) Field of Search ................................. 427/2.24, 2.3, 427/2.31, 333; 428/333, 426, 447, 457, 522; 606/76, 77; 623/1.46

(56) References Cited

U.S. PATENT DOCUMENTS 5,409,696 * 4/1995 Narayanan et al. ............... 424/78.17

OTHER PUBLICATIONS

"Chemical Modification of Hyaluronic Acid by Carbodiimides", Kuo et al, *Bioconjugate Chem.* '91, vol. 2, pp. 232–241.

"Assess. of Cell Binding to Hyaluronic Acid in a Solid–Phase Assay", Lee Guo et al, *Anal. Biochem.*, '96, vol. 233, pp. 216–220.

* cited by examiner

*Primary Examiner*—D. S. Nakarani
(74) *Attorney, Agent, or Firm*—William H. Eilberg

(57) ABSTRACT

A substrate is rendered highly lubricious and wettable, by treating the substrate so that it becomes amine-functionalized, and chemically joining an aldonic acid to amine groups on the substrate. In the preferred embodiment, the chemical joining is performed with the aid of a coupling agent, such as a water-soluble carbodiimide, the coupling agent participating in the reaction which joins the aldonic acid to the amine groups, and which forms a residue that can be discarded. The coupling agent makes it possible to perform the process at room temperature. The method can be used to coat articles such as contact lenses, intra-ocular lenses, or other devices which are intended to be temporarily or permanently implanted in the body. The method can also be used in other fields, such as in coating of goggles, windshields, and other objects.

13 Claims, 1 Drawing Sheet

HYDROPHILIC SUBSTRATES AND METHOD OF MAKING SAME

BACKGROUND OF THE INVENTION

The present invention relates to the field of treating substrates to make them exceptionally hydrophilic and lubricious. The substrates so treated are intended especially for use in devices which are implanted in the body, but can be used in other applications.

It is important that any artificial device, which is implanted in the body, be biocompatible, highly lubricious, and wettable. Examples of devices which are permanently implanted include, but are not limited to, stents, intraocular lenses, and artificial pacemakers. Examples of devices which are temporarily implanted include, but are not limited to, contact lenses, vascular catheters and guidewires, and vascular introducers.

Coatings which increase the wettability of an underlying substrate are also useful in fields outside of medicine. For example, divers' goggles and masks, and eyeglasses used in water sports, are advantageously treated to make them more hydrophilic. As the objects become more hydrophilic, the contact angle, defined as the angle between the surface of the object and a tangent to the surface of a bead of water resting on the object, becomes relatively low. Divers' goggles or masks, when so treated, show minimal fogging in humid conditions. Eyeglasses so treated tend to provide undistorted vision, even when wet with water spray or snow.

Various means of imparting lubricity and wettability to surfaces have been proposed. Water-soluble polymers such as polyvinyl pyrrolidone and crosslinkable copolymers of N-vinyl pyrrolidone have found limited use as hydrophilic coatings, but these coatings have not been fully satisfactory, from the perspective of performance and durability.

Much attention has been given to ways of using the polysaccharides such as hyaluronic acid, heparin, and chondroitin sulfate, as components of coatings with good lubricity and wettability. U.S. Pat. Nos. 4,801,475 and 5,023,114, the disclosures of which are hereby incorporated by reference herein, disclose the application of such mucopolysaccharides as top coats grafted onto base coats with good adhesion and modulus matched to that of the substrate.

In the so-called "Carmeda" process, a polyamine such as polyethylenimine (PEI) is deposited on the substrate and a fragment of heparin carefully isolated to contain the anti-thrombotic active center, and terminated with an aldehyde group, is anchored on the substrate by formation of a Schiff base. Schiff bases can readily revert to the original aldehyde and amine, and the composition may be stabilized finally by chemical reduction.

U.S. Pat. Nos. 5,336,518 and 5,356,433, the disclosures of which are also incorporated by reference herein, show the attachment of heparin or other mucopolysaccharide to amine-functionalized surfaces of metals such as those used in the construction of stents, by use of 1-(3-dimethylaminopropyl)-3-ethyl-carbodiimide (EDC) or other carbodiimide. However, it has been shown (see Prestwick et al, Bioconjugate Chemistry, 1991, Vol. 2, pages 232–241) that under very similar conditions, none of the expected intermolecular coupling of hyaluronic acid with the amine occurs, but rather, hyaluronate-acylureas are produced. In a study of the attempted attachment of hyaluronic acid and chondroitin sulfate to amine-functionalized polystyrene, it has been speculated (see Hildreth et al, Anal. Biochem., 1996, Vol. 233, pages 216–220) that the much higher viscosity of hyaluronic solutions may be responsible for lower rates of attachment than with chondroitin sulfate solutions.

The use of hyaluronic acid, coupled to amine-functionalized surfaces, has several disadvantages. The attachment of hyaluronic acid is subject to variable results and low yields, and the high cost of suitable grades of hyaluronic acid limits its practical use to a few applications. The effective cost of hyaluronic acid is increased by the fact that solutions of polysaccharides have only short life before being attacked by microorganisms. A further problem with polysaccharide coatings is that they cannot be sterilized by gamma-radiation or by an electron beam without a serious loss in lubricity.

Other water-soluble polymers of very high molecular weight and viscosity, such as carboxymethyl cellulose and hydroxypropyl methyl cellulose, have also been used as components of hydrophilic coatings. A major disadvantage of these materials is that their high molecular weight makes their viscosity high. To counteract the high viscosity, one must reduce the concentration of the materials, but doing so may lead to the formation of unacceptably thin coatings on the substrate.

The present invention provides a simple, economical, and effective method of providing a hydrophilic and lubricious coating on a substrate. In the present invention, a substrate is coated with an inexpensive material of low molecular weight, but the resulting coating is at least as lubricious, hydrophilic, and durable as coatings formed with more expensive materials of high molecular weight.

SUMMARY OF THE INVENTION

The present invention includes a method of imparting lubricity and wettability to a substrate. The method comprises the principal steps of treating the substrate so that the substrate becomes amine-functionalized, and chemically joining an aldonic acid to amine groups on the substrate.

In the preferred embodiment, the chemical joining is performed by mixing aldonic acid with a coupling agent, which can be a water-soluble carbodiimide, such as 1-ethyl-3-(3-dimethylaminopropyl)carbodiimide (EDC). The pH of the mixture is adjusted until the pH stabilizes. Then the mixture is brought into contact with the substrate, at room temperature. Components of the aldonic acid and the coupling agent react with the amine groups on the substrate, such that the substrate becomes coated with aldonic acid amide. The components which do not form part of the aldonic acid amide can be washed away and discarded.

The substrate is preferably amine-functionalized by exposing the substrate to a plasma, so as to activate its surface, and then exposing the substrate to a material containing amine groups, such as polyethylenimine (PEI). The substrate can be pre-treated with a highly adherent material, such as acrylic acid polymers or copolymers, to promote the adherence of the amine groups to the substrate.

The invention also includes a substrate which has been treated according to the method described above. The substrate can be metal, glass, plastic, rubber, or other material.

The invention is especially useful in forming coatings of objects that are intended to be temporarily or permanently implanted in the human body. The invention is not limited to such uses, however.

The invention therefore has the primary object of providing a method of imparting a highly lubricious and wettable coating to a substrate.

The invention has the further object of providing a method as described above, wherein the method uses materials of relatively low molecular weight.

The invention has the further object of improving the lubricity and wettability of hydrophilic coatings applied to various kinds of substrates.

The invention has the further object of reducing the cost of providing a lubricious and wettable coating.

The invention has the further object of enhancing the performance of various objects which are temporarily or permanently implanted into the human body.

The invention has the further object of providing a coated substrate having the desirable properties described above.

The reader skilled in the art will recognize other objects and advantages of the present invention, from a reading of the following brief description of the drawings, the detailed description of the invention, and the appended claims.

DETAILED DESCRIPTION OF THE INVENTION

The present invention comprises the method of coupling simple aldonic acids, of low molecular weight, with amine-functionalized surfaces. The process is conducted at room temperature. The process yields coated surfaces having remarkably low contact angle, excellent lubricity, resistance to decomposition or detachment during autoclaving, and other unexpected and unpredicted superior qualities. The invention also comprises the substrate prepared according to the method described above.

By definition, the aldonic acids are those that can be produced by mild oxidation of the corresponding aldehyde carbohydrates, or aldoses. The generalized structure of the simple aldonic acids is:

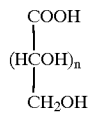

where n is any integer from one to ten.

Thus, for example, D-gluconic acid, in which n=4, also known as pentahydroxycaproic acid, can be produced by oxidizing alpha-D-glucose, and has been made commercially by the fermentative oxidation of the aldehyde group in glucose from corn. It will be recognized that each of the carbon atoms between the carboxyl group and the terminal methylol group is a stereo-center, and the six-carbon aldonic acid has sixteen stereoisomers. Some of these are allonic, altronic, gluconic, mannonic, gulonic, idonic, galactonic, and talonic acids. The acids with five or more carbons can form internal lactones, and this may be the principal form of particular ones of the dry acids. This is not a limitation to their use, however, because when they are reacted in aqueous media, the open and ring forms are in dynamic equilibrium.

The aldonic acid may also have a limited number of hydroxyl groups replaced by other hydrophilic substituent groups, such as methylol or methoxymethyl, acetal or hemiacetal, or polyethoxyethyl, acetate or sulfate. Some of these might most conveniently be introduced after the aldonic acid is attached to the substrate, although in other cases, the substitution may be made on the aldonic acid itself before it is coupled to the substrate. Therefore, as used in this specification, the term "aldonic acid" is intended to include such variations.

The aldonic acid is coupled to the amine-functionalized substrate with the aid of a coupling agent which, in the preferred embodiment, is a water-soluble carbodiimide such as 1-ethyl-3-(3-dimethylaminopropyl)carbodiimide (EDC). Carbodiimides can be represented generically as

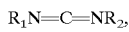

where $R_1$ and $R_2$ are alkyl groups. EDC is preferred because it is water-soluble and because it is commercially available, but the invention is not limited to EDC or to any particular carbodiimide.

Figure 1A:
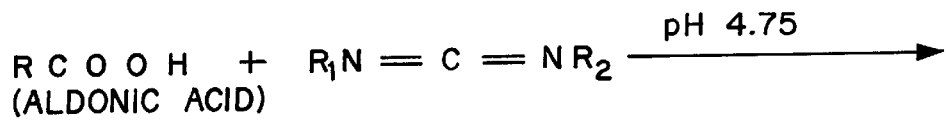
FIGS. 1(a) and 1(b) provide chemical formulae and schematic diagrams illustrating the process of the present invention.
Figure 1A:
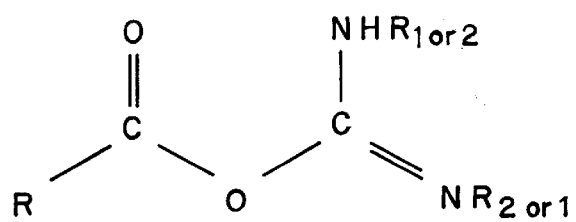
Figure 1B:
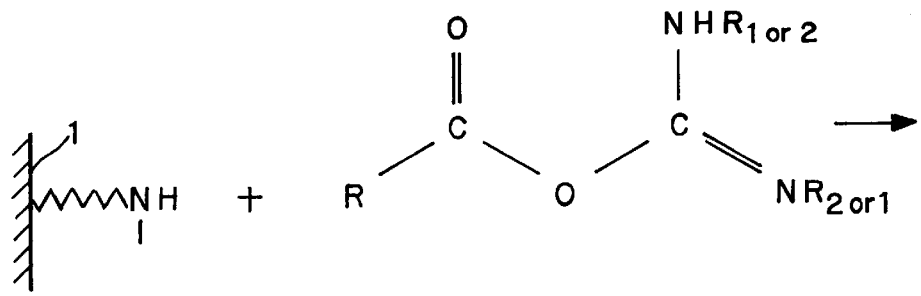
Figure 1B:
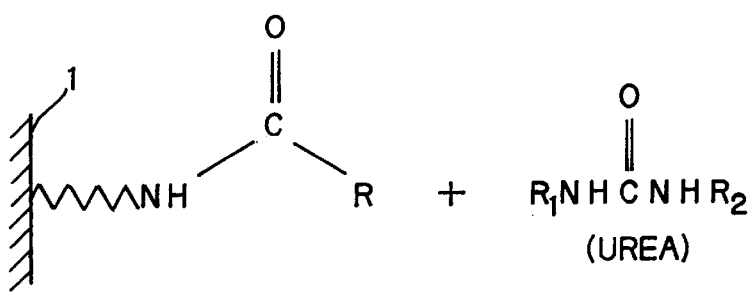

The reactions which are believed to occur in the process of the present invention are illustrated in FIGS. 1(a) and 1(b). However, the invention should not be deemed limited by the following description of the mechanism of the reaction.

FIG. 1(a) depicts the initial "activation" step. In this step, the EDC and the aldonic acid (represented by the symbol RCOOH, where R is the remainder of the aldonic acid molecule as defined above) are mixed in water solution and the pH held at about 4.75 for a period of up to two hours, by adding hydrochloric acid judiciously. In the second step, the "activated" reaction product is then brought into contact with substrate 1 which has been functionalized with amine groups (represented by NH). The amine is converted to an amide, and the remaining components of the reaction product are converted to a urea derivative which is washed away and discarded. The result is that the aldonic acid becomes covalently bonded to the amine groups, forming an aldonic acid amide which is firmly attached to the substrate. FIG. 1(b) shows that a hydroxyl group of the aldonic acid has been replaced by the amine (NH) which has been previously attached to substrate 1.

The EDC therefore functions, in part, like a catalyst, because it facilitates the attachment of the aldonic acid to the amine-functionalized substrate. Indeed, the reaction would not take place under mild conditions in the absence of the carbodiimide. But the EDC is not a true catalyst because it also participates in the reaction, and is converted in the process to a worthless by-product.

The coated substrate made by the present invention therefore comprises a plurality of aldonic acid amide groups which are firmly attached to the substrate. Although the aldonic acid amide has a relatively low molecular weight, the coating has been observed to behave, macroscopically, as if it were made of molecules of very high molecular weight. That is, the hydrophilic coating formed by the plurality of very small molecules is at least as effective, or more so, than coatings formed with large molecules such as the mucopolysaccharides.

The following is a general discussion of the reaction conditions necessary to the practice of the present invention.

As explained above, it is first necessary to treat the substrate so that it is amine-functionalized. This step can be performed in various ways. A convenient reagent to use for this purpose is polyethylenimine (PEI), available in various grades from the Aldrich Chemical Company. The substrate may be cleaned to remove oils and grease, and then may be treated with a plasma to activate the surface and to allow the PEI to become firmly anchored thereto. PEI contains a large number of NH groups, and each molecule is terminated with $NH_2$. Both NH and $NH_2$ are capable of forming aldonic acid amides. PEI is advantageous because of its relatively low cost, and its availability in various molecular weights. But there are other ways of imparting amine functionality to a surface, and the invention is not limited to a particular method.

In some cases, it may also be desirable to treat the surface with a highly adherent material, such as an acrylic acid polymer or copolymer, and then apply the PEI to become pendent to the polymer. In this case, the PEI would be adhesively bonded to the polymer, but it would still be the PEI which would display the amine functionality. The present invention is not limited to a particular choice of adherent material.

After the substrate has been amine-functionalized, a dilute solution, in distilled water, of the aldonic acid, or a water-soluble salt of the acid, is prepared, and to it is added the water-soluble carbodiimide, such as EDC. The weight ratio of acid to EDC may be in the range of 1–100%, and preferably in the range of 5–50%. The pH of the solution is adjusted to 4.75 and maintained in the range of 4.7 to 4.8 until the pH becomes stable: this will usually be a period of about 1.5 to 2 hours at room temperature. The resulting solution and the object to be treated (i.e. the substrate) are then brought together and held at room temperature for up to 16 hours. The object is washed and may be sterilized, if desired.

In general, the quantity of aldonic acid, relative to that of the amine groups, can be varied from an amount representing a full stoichiometric equivalent, to some lesser amount.

The conditions described above may be varied considerably, as will be apparent to those skilled in the art, without materially changing the final result.

The process described above has been found to effect permanent attachment of the aldonic acid to the substrate, with consequent enhancement of the properties of the substrate.

The coating provided by the present invention may reduce the contact angle, as defined above, to about 85° or less. As shown by the following example, the contact angle achievable with the present invention may be far less than 85°. In many applications, even a 15-degree reduction in contact angle can be very significant.

EXAMPLE 1

One-tenth gram (0.00046 mol) of sodium D-gluconate was dissolved in 50 grams of distilled water. This solution had a pH of 6.41, and to it was added N/100 HCl to reduce the pH to 4.77. To this solution was added 0.0892 gram (0.00046 mol) of EDC. The pH of the resulting solution was 5.38, and N/100 HCl was added to bring the pH down to 4.75. The reaction quickly caused the pH to tend to rise, but the pH was maintained in the range of 4.70 to 4.80 by continued additions of HCl. After 66 minutes, the pH stabilized, and no further acid additions were made. Then, a silicone contact lens, amine-functionalized with PEI, was placed in the solution and gently stirred for sixteen hours. At the end of this period, the lens was washed thoroughly with distilled water. When tested, the lens was found to show a contact angle of 37 to 41 degrees. After sterilization by autoclaving, the contact angle stabilized at 38 to 39 degrees. This measurement showed that the lens was highly wettable, since untreated lenses of this type show a contact angle of approximately 100 degrees. The reduction in contact angle also showed that the gluconic acid was firmly attached to the lens. The lens was very lubricious, which makes it especially desirable for use as an extended-wear lens. A lubricious surface tends to resist the accumulation of debris from proteinaceous particles in the eye, and therefore has a much longer useful life than a surface which does not have such lubricity. Moreover, a lubricious surface on a contact lens is less likely to irritate the surrounding eye muscles, thereby reducing the incidence of eyestrain.

EXAMPLE 2

The procedure of Example 1 was followed on a larger scale, to prepare approximately 500 grams of the solution of the adduct of EDC and D-gluconic acid. About 20 grams of this solution was added to each of 25 amine-functionalized silicone lenses in glass vials. These vials were capped and shaken periodically over a period of sixteen hours. After washing and sterilizing, the lenses were tested in human eyes and found to be more comfortable and cleaner in use than untreated lenses. The treatment caused no distortion of the original optical properties.

It may be desirable to catalyze the coupling reaction with N-hydroxysuccinimide (NHS), which has been used, in the prior art, to catalyze the reaction of mucopolysaccharides with amine-functionalized surfaces in the presence of carbodiimides. The present invention differs from the above-described prior art in that the present invention does not use mucopolysaccharides. Also, as is clear from the above description, the present invention achieves the desired coupling without the use of NHS. However, NHS might be used as a catalyst in the reactions with aldonic acids, possibly to accelerate a slow reaction.

The process of the present invention will work on any surface that can be functionalized to display the amino group. Thus, the substrate could be made of metal, glass, plastic, rubber, or other material. The invention is not limited to the use of a particular material.

Although the invention is especially useful in coating medical devices and other objects that are temporarily or permanently implanted in the body, it can be used in non-medical fields. In addition to the goggles and eyeglasses for water sports, mentioned above, the coatings of the present invention could be used on windshields, mirrors, and razors.

Another advantage of the present invention is that the lubricious coatings made thereby are not attacked by ultraviolet light, unlike the case of mucopolysaccharides. In many, if not most cases, the coatings of the present invention are more economical than those based on mucopolysaccharides.

The invention can be modified in various ways. The particular method of imparting amine-functionality to the substrate can be varied. The coupling agent need not be limited to EDC. The type of aldonic acid used, and the substituent groups forming part of such acid, can also be varied. These and other modifications, which will be apparent to those skilled in the art, should be considered within the spirit and scope of the following claims.

What is claimed is:

1. A method of imparting lubricity and wettability to a substrate, comprising the steps of:
   a) treating the substrate with polyethylenimine (PEI) so that the substrate becomes amine-functionalized, and
   b) chemically joining a material selected from the group consisting of aldonic acids and water-soluble salts of aldonic acids, to amine groups on the substrate.

2. The method of claim 1, wherein step (b) is performed at room temperature.

3. A substrate made by the method of claim 1.

4. A method of imparting lubricity and wettability to a substrate, comprising the steps of:
   a) treating the substrate so that the substrate becomes amine-functionalized,
   b) combining a solution selected from the group consisting of an aldonic acid and a water-soluble salt of an aldonic acid, with a coupling agent, the coupling agent being selected to be a substance which promotes the chemical joining of aldonic acid with amine groups, and c) bringing the substrate into contact with the combination formed in step (b), wherein step (a) comprises treating the substrate with polyethylenimine (PEI).

5. The method of claim 4, wherein step (a) also includes treating the substrate with a plasma to activate a surface of the substrate and to allow the PEI to become firmly anchored to the substrate.

6. The method of claim 4, wherein step (b) is followed by the step of adjusting a pH of the solution such that it is in a range of about 4.7–4.8.

7. The method of claim 4, wherein step (c) is performed at room temperature, for a period of up to 16 hours.

8. The method of claim 4, wherein the coupling agent is selected to be a water-soluble carbodiimide.

9. The method of claim 8, wherein the water-soluble carbodiimide comprises 1-ethyl-3-(3-dimethylaminopropyl) carbodiimide (EDC).

10. The method of claim 4, wherein step (c) also comprises the step of bringing the substrate and the combination into contact with N-hydroxysuccinimide (NHS).

11. A substrate made by the method of claim 4.

12. A substrate having a lubricious, hydrophilic coating formed of aldonic acid amide, the coating being firmly adhered to the substrate.

13. The substrate of claim 12, wherein the substrate is made of a material selected from the group consisting of metal, glass, plastic, and rubber.

* * * * *